United States Patent
Widjaja et al.

(10) Patent No.: US 7,669,089 B2
(45) Date of Patent: Feb. 23, 2010

(54) MULTI-LEVEL FILE REPRESENTATION CORRUPTION

(75) Inventors: Herman Widjaja, Issaquah, WA (US); Mariyan D. Fransazov, Redmond, WA (US); Ling Wo, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 687 days.

(21) Appl. No.: 11/555,614

(22) Filed: Nov. 1, 2006

(65) Prior Publication Data

US 2008/0170684 A1 Jul. 17, 2008

(51) Int. Cl.
*G06F 11/00* (2006.01)

(52) U.S. Cl. .............. 714/701; 714/15; 714/47

(58) Field of Classification Search .......... 707/6, 707/200; 709/201, 206; 714/15, 701, 47
See application file for complete search history.

(56) References Cited

U.S. PATENT DOCUMENTS

| 6,889,158 | B2 | 5/2005 | Penov et al. |
| 6,966,027 | B1 | 11/2005 | Krasinski |
| 7,028,223 | B1 | 4/2006 | Kolawa et al. |
| 7,036,073 | B2 | 4/2006 | Jones et al. |
| 7,089,491 | B2 | 8/2006 | Feinberg et al. |
| 7,296,017 | B2 * | 11/2007 | Larcheveque et al. ........ 707/6 |
| 7,337,358 | B2 * | 2/2008 | Jones et al. ........ 714/15 |
| 7,546,334 | B2 * | 6/2009 | Redlich et al. ........ 709/201 |
| 7,555,519 | B2 * | 6/2009 | Darby ........ 709/206 |
| 7,603,388 | B2 * | 10/2009 | Wood et al. ........ 707/200 |
| 2005/0246629 | A1 | 11/2005 | Hu |
| 2006/0070034 | A1 | 3/2006 | Balfe et al. |
| 2006/0085489 | A1 | 4/2006 | Tomic et al. |
| 2007/0165267 | A1 * | 7/2007 | Fransazov ........ 358/1.15 |

OTHER PUBLICATIONS

DeMott, "The Evolving Art of Fuzzing", retrieved at <<http://www.threatmind.net/secwiki/FuzzingTools? action=AttachFile&do=get&target=DeMott-TheEvolvingArtofFuzzing.pdf#search=%22fuzzing%20algorithms%20testing%20security%20robustness%22>>, Jun. 1, 2006, pp. 1-25.

Michael, et al., "Black Box Security Testing Tools", retrieved at <<https://buildsecurityin.us-cert.gov/daisy/bsi/articles/ tools/black-box/261.pdf#search=%22fuzzing%20algorithms%20testing%20security%20robustness%22>>, Cigital, Inc., Dec. 28, 2005, pp. 1-31.

Zuber, "Test Strategies for XPS Consumers", retrieved at <<http://www.qualitylogic.comfassets/pdfs/library/QLI_WinHec06.pdf>>, Microsoft Corporation, May 11, 2006, pp. 1-5.

* cited by examiner

*Primary Examiner*—David Ton
(74) *Attorney, Agent, or Firm*—Lee & Hayes, PLLC (57) ABSTRACT

Methods and systems provide an approach for corrupting file representations at multiple different levels to provide a robust file corruption tool. In accordance with the described embodiments, file representation corruption can take place at a file's physical representation, logical representation and/or content representation.

20 Claims, 6 Drawing Sheets

MULTI-LEVEL FILE REPRESENTATION CORRUPTION

BACKGROUND

When individual file formats are processed by consuming devices (both software and hardware devices), the overall security of the consuming device and file format content, as well as the stability of the consuming device can be compromised by corrupted file formats. Thus, testing consuming devices for how they handle corrupted file formats can lead to an appreciation of how best to diagnose and address the integrity and stability of the consuming device.

SUMMARY

Methods and systems provide an approach for corrupting file representations at multiple different levels to provide a robust file corruption tool. In accordance with the described embodiments, file representation corruption can take place at a file's physical representation, logical representation and/or content representation.

DETAILED DESCRIPTION

Overview

Methods and systems provide an approach for corrupting file representations at multiple different levels to provide a robust file corruption tool. In accordance with the described embodiments, file representation corruption can take place at a file's physical representation, logical representation and/or content representation.

In one described embodiment a file can be physically represented by an archive, such as a ZIP archive. Corruption techniques can be employed at the archive level to test how consuming devices process the corrupted physical representation. In addition, a file can have a logical representation which describes a file's logical parts and how the parts are related to one another. At this level, corruption techniques can be employed to test how consuming devices process the corrupted logical representation. Further, a file can have a content representation which describes the actual content of the file. At the content representation level, file corruption techniques can be employed to test how consuming devices process the corrupted content representation.

In the discussion that follows, a first section entitled "Multi-level File Representation Corruption" is provided and introduces the notion of corrupting files at multiple different levels of its representation. Following this, a section entitled "Implementation Example" is provided and describes but one exemplary implementation of multi-level file representation corruption.

Multi-Level File Representation Corruption

Figure 1:
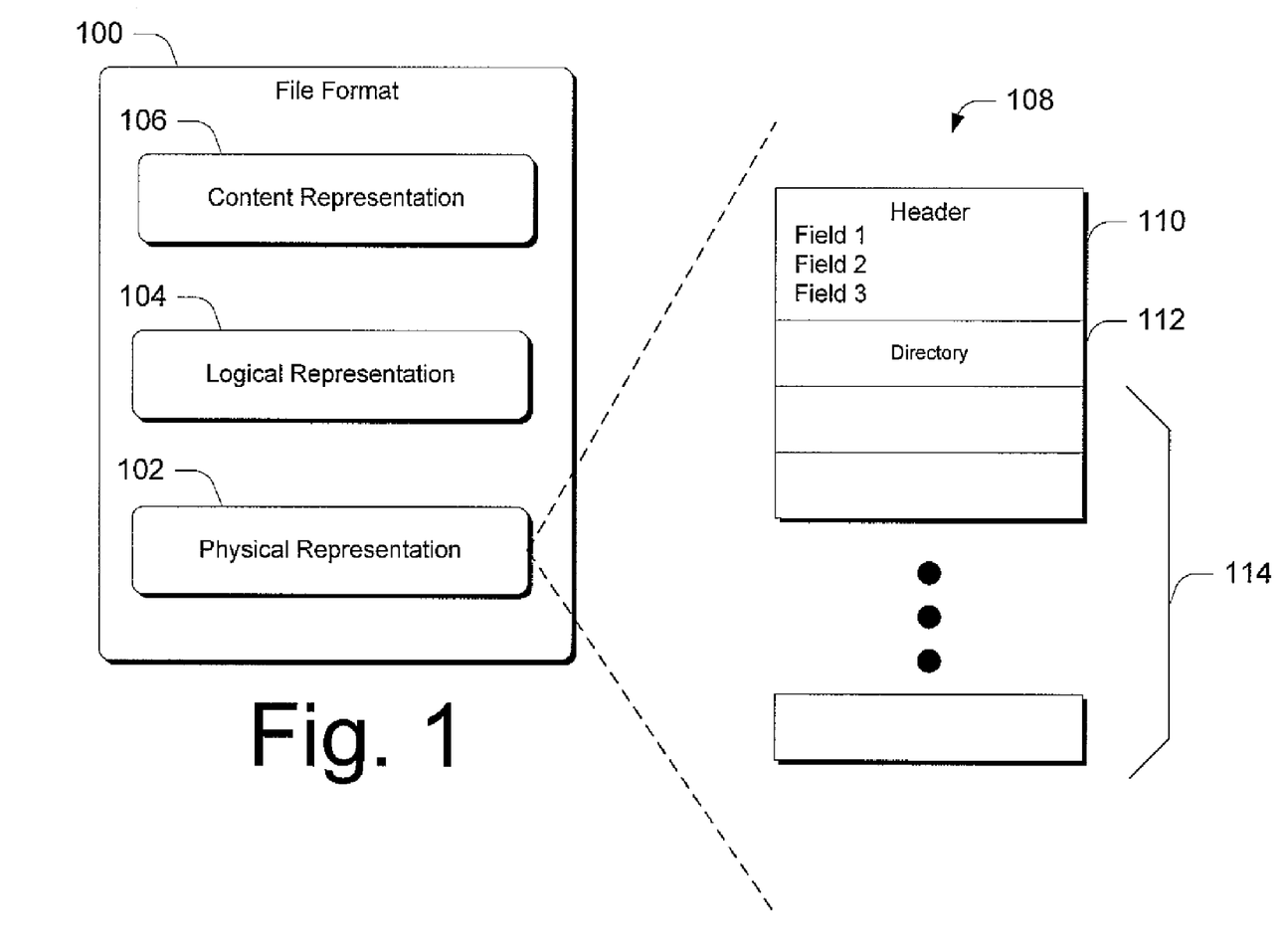
FIG. 1 shows an exemplary file format in accordance with one embodiment.

FIG. 1 shows an exemplary file format in accordance with one embodiment generally at 100. In this example, file format 100 includes multiple levels of representation including a physical representation 102, a logical representation 104, and a content representation 106.

In accordance with the described embodiments, file format corruption can take place at multiple different levels of the file format 100.

Corruption at the Physical Representation Level

In the illustration, exemplary components of a physical representation of a file format are shown generally at 108 and include a header portion 110 and components that follow the header portions such as a central directory portion 112 and various other portions that can be referenced by the header or central directory portion. It is to be appreciated and understood that the exemplary components of the physical representation are shown as an example only. Accordingly, other physical representations can be utilized without departing from the spirit and scope of the claimed subject matter.

In this example, the physical representation describes a set of structures that represent the physical file or files. The header portion usually contains a number of fields that pertain to the referenced file. For example, some of these fields can represent variable length buffers that occur after the header. Yet other fields can pertain to which version of a pertinent specification the physical representation conforms. Some physical representations also include some type of a central directory portion 112 that serves as a description of the basic structure of the physical representation.

Needless to say, there are a number of different types of physical representations that can be utilized that include characteristics or properties that are the same as, similar to or different from those mentioned above. Regardless of the form of physical representation, in accordance with one embodiment, corruption techniques can be employed at the physical representation level to corrupt the physical representation.

As but examples of the types of corruption that can take place, consider the following. In accordance with at least some embodiments, header data can be manipulated to corrupt the physical representation. Such manipulations can include, by way of example and not limitation, adding or removing content such as fields, manipulating the content of the individual fields, duplicating fields, manipulating content such as any bitmasks or bit fields in the header and the like.

For example, some fields can be modified in an attempt to expose problems such as buffer overruns. For example, one field may specify that a certain buffer is of a fixed length size—1000 bytes. In this case, the field might be modified to write in the size of the buffer to be 2000 bytes. Then, when a consuming device reads the header field and, responsively, reads 2000 bytes, a buffer overrun will occur. As another example, suppose a field represent bitmasks which, in turn, represent or indicate whether the physical representation is subject to a particular portion of a relevant specification. Such bitmasks can be manipulated to reference a different or nonexistent specification.

Yet other examples of corruptions or manipulations that can take place include, by way of example and not limitation, randomly clipping (i.e. removing) portions of the physical representation. For example, the header portion and a portion of the content thereunder might be clipped. Now, this physical representation can be utilized to test the security and integrity of consuming devices.

It is to be appreciated and understood that while certain instances of manipulations and corruptions have been described, other manipulations and corruptions can take place without departing from the spirit and scope of the claimed subject matter.

Corruption at the Logical Representation Level

In at least some embodiments, corruption can take place at the logical representation level. As an example, consider FIG. 2. There, a file has a logical representation 200 which describes, in some way, a file's logical parts and how the parts are related to one another.

The logical representation can be represented in any suitable way. For example, the logical representation might describe a series of interrelated file portions. In addition, a naming scheme might define well-understood conventions that are to be used in logically representing the files. For example, in some embodiments, individual files can be interleaved. An interleaving naming convention may then be used to describe the file portions and define how the file portions are to be reassembled. In this particular example, manipulation of the logical representation can change the structure of the interleaving by, for example, changing the ordering of the file portions, removing file portions, adding file portions that do not comply with the naming convention and the like. Now, during construction of the associated file, the consuming device will attempt to merge all of the file portions into a single file again. Having manipulated the interleaved file portions, when the consuming device attempts to construct the file, the security and integrity of the consuming device can be tested.

Figure 2:
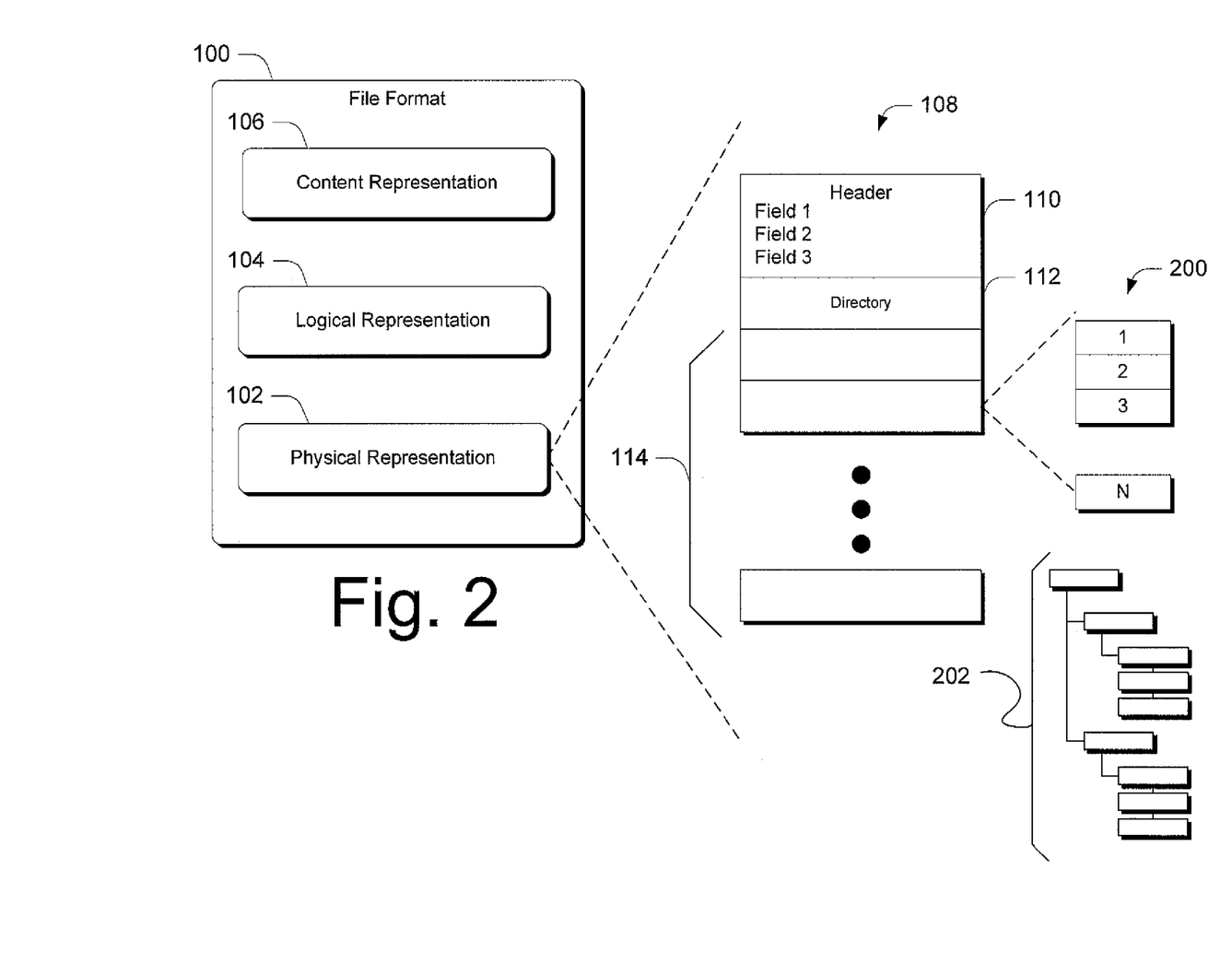
FIG. 2 illustrates an exemplary logical representation level in accordance with one embodiment.

In addition, at the logical level, a file can have a file structure that should conform to a certain directory structure. As an example, consider the directory structure shown generally at 202. Here, there is a hierarchical relationship between the different parts of the file structure. In addition, a well-defined set of rules can describe this relationship. In at least some embodiments, an index file is used to reference into the file structure to provide a starting point for a consuming device to understand the file structure. In such a case, the index file can be manipulated or removed to corrupt the logical level. Thus, when a consuming device attempts to process the logical level representation by reading the index file, its integrity can be tested.

In addition, portions of the file or directory structure can be manipulated in contravention of one or more rules that describe how the file or directory structure is to be interrelated. For example, if a file structure's logical representation always requires one and only one particular component, then removing or duplicating that component should result in a processing error. Accordingly, here the hierarchical structure of the file or directory structure can be manipulated to inject a corruption. Further, individual portions of the file or directory structure can be renamed or misnamed in contravention of any naming conventions to inject a processing error. Renaming or misnaming portions of the file or directory structure can result in subsequent mapping errors when the consuming device attempts to read the corresponding file.

The examples above constitute but a few examples of corruption techniques that can be employed at the logical representation level. Other techniques can be utilized without departing from the spirit and scope of the claimed subject matter.

Corruption at the Content Representation Level

In at least some embodiments, corruption can take place at the content representation level. Here, different types of manipulation can take place. For example, actual physical content of the files can be corrupted and individual index files can be corrupted.

Specifically, each of the individual files includes content, such as images, text, fonts, profile information, printing information and the like. Here, the actual content of files can be manipulated and corrupted. For example, some files can reside as XML files. Corruption can take place by removing XML tags, adding erroneous XML tags and/or changing the general semantics or content of the XML. Additionally, resources within and referenced by the XML can be corrupted by inserting or referencing corrupted resources. These corrupted resources can be, in at least some embodiments, acquired from a library of corrupted resources.

Alternately or additionally, individual index files that comprise part of the content representation level can be manipulated or corrupted. For example, often times at the physical representation level there is an index file that includes mappings or references to individual parts of the file. For example, each part of a file may have an associated mapping that indicates where that part may be found. By removing the index file all together, the consuming device will be unable to locate any mappings and thus, should generate an error when processing the content representation. Alternately or additionally, the mappings within the index file can be changed. For example, a URI that references a particular content part might be changed to an Internet URL to induce a processing error. Needless to say, various types of manipulations or corruptions can take place at this level.

Having now described how multi-level file representation manipulation can take place, consider the implementation example just below.

Implementation Example

In accordance with one embodiment, the above-described embodiments can be employed in connection with documents that confirm to the XML Paper Specification (XPS) version 0.95, available from Microsoft Corporation. As background, XPS describes a set of conventions for the use of XML and other widely available technologies to describe the content and appearance of paginated documents. It is written for developers who build systems that process XPS content. One goal of XPS is to ensure the interoperability of independently created software and hardware systems that produce or consume XPS content. The XPS specification defines the formal requirements that producers and consumers satisfy in order to achieve interoperability.

In the description below, a paginated-document format called the XPS Document is described. The format requirements are an extension of the packaging requirements described in the Open Packaging Conventions (OPC) specification. The OPC specification is available, as of this writing, at:

http://www.ecma-international.ord/news/
   TC45_current_work/TC45_available_docs.htm Part 2 (Open Packaging Conventions) and Part 5 (Markup Compatability and Extensibility). That specification describes packaging and physical format conventions for the use of XML, Unicode, ZIP, and other technologies and specifications to organize the content and resources that make up any document. OPC is an integral part of the XPS specification.

In the discussion below, certain high level aspects of XPS are described for the purpose of providing at least some context of how the above-described principles can be employed in a tangible context. For a detailed treatment of XPS, the reader is referred to the specification referenced above.

XPS Document Format

The XPS specification describes how the XPS Document format is organized internally and rendered externally. It is built upon the principles described in the Open Packaging Conventions specification. The XPS Document format represents a set of related pages with a fixed layout, which are organized as one or more documents, in the traditional meaning of the word. A file that implements this format includes everything necessary to fully render those documents on a display device or physical medium (for example, paper). This includes all resources such as fonts and images that might be required to render individual page markings.

In addition, the format includes optional components that build on the minimal set of components required to render a set of pages. This includes the ability to specify print job control instructions, to organize the minimal page markings into larger semantic blocks such as paragraphs, and to physically rearrange the contents of the format for easy consumption in a streaming manner, among others.

Finally, the XPS Document format implements the common package features specified by the Open Packaging Conventions specification that support digital signatures and core properties.

Figure 3:
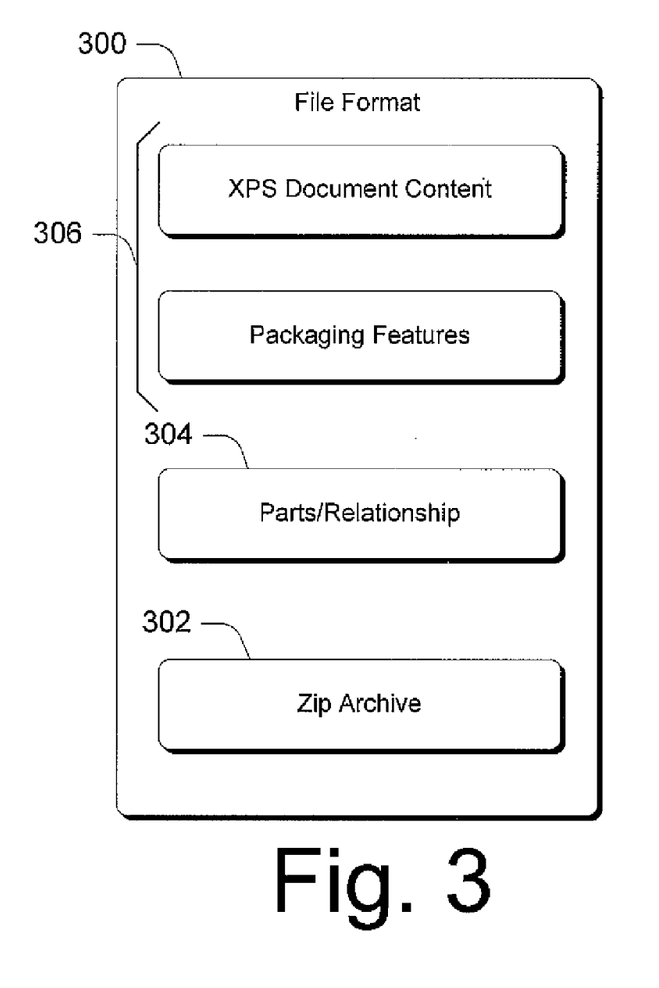
FIG. 3 illustrates an exemplary XPS Document format in accordance with one embodiment.

The XPS Document format uses a ZIP archive for its physical model. The Open Packaging Conventions specification describes a packaging model, that is, how the package is represented internally with parts and relationships. An example of the XPS Document format is shown in FIG. 3 generally at 300. Format 300 includes a ZIP archive 302 which constitutes a physical representation level, a parts/relationships level 304 which constitutes a logical representation level, and a Packaging Features and XPS Document Content level 306 which constitutes the content representation level.

The specification for the ZIP archive is well-known and, for the sake of brevity, is not described in detail here. It is to be appreciated and understood that the above-described physical representation manipulations and corruptions can be applied at the ZIP archive level.

Parts/Relationships

The packaging conventions described in the Open Packaging Conventions specification can be used to carry any payload. A payload is a complete collection of interdependent parts and relationships within a package. The XPS specification defines a particular payload that contains a static or "fixed-layout" representation of paginated content: the fixed payload.

A package that holds at least one fixed payload and follows the rules described in this specification is referred to as an XPS Document. Producers and Consumers of XPS Documents can implement their own parsers and rendering engines based on this specification.

The XPS Document format includes a well-defined set of parts and relationships, each fulfilling a particular purpose in the document. The format also extends the package features, including digital signatures, thumbnails, and interleaving.

A payload that has a FixedDocumentSequence root part is known as a fixed payload. A fixed payload root is a FixedDocumentSequence part that references FixedDocument parts that, in turn, reference FixedPage parts. There can be more than one fixed payload in an XPS Document.

A specific relationship type is defined to identify the root of a fixed payload within an XPS Document: the XPS Document Startpart relationship. The primary fixed payload root is the FixedDocumentSequence part that is referenced by the XPS Document StartPart relationship. Consumers such as viewers or printers use the XPS Document StartPart relationship to find the primary fixed payload in a package. The XPS Document StartPart relationship must point to the FixedDocumentSequence part that identifies the root of the fixed payload. Manipulations at this level can include manipulating or corrupting the XPS Document StartPart such that it might not point to the FixedDocumentSequence part. Alternately or additionally, manipulations can include corrupting the FixedDocumentSequence part as by changing its semantics in an unpermitted way.

The payload includes the full set of parts required for processing the FixedDocumentSequence part. All content to be rendered must be contained in the XPS Document. The parts that can be found in an XPS Document are listed in the table just below.

| Name | Description |
| --- | --- |
| FixedDocumentSequence | Specifies a sequence of fixed documents. |
| FixedDocument | Specifies a sequence of fixed pages. |
| FixedPage | Contains the description of the contents of a page. |
| Font | Contains an OpenType or TrueType font. |
| JPEG image | References an image file. |
| PNG image | |
| TIFF image | |
| Windows Media Photo image | |
| Remote resource dictionary | Contains a resource dictionary for use by fixed page markup. |
| Thumbnail | Contains a small JPEG or PNG image that represents the contents of the page or package. |
| PrintTicket | Provides settings to be used when printing the package. |
| ICC profile | Contains an ICC Version 2 color profile optionally containing an embedded Windows Color System (WCS) color profile. |
| DocumentStructure | Contains the document outline and document contents (story definitions) for the XPS Document. |
| StoryFragments | Contains document content structure for a fixed page. |
| SignatureDefinitions | Contains a list of digital signature spots and signature requirements. |
| DiscardControl | Contains a list of resources that are safe for consumers to discard during processing. |

Manipulations here can further include removing required parts or references to parts of the XPS Document.

Figure 4:
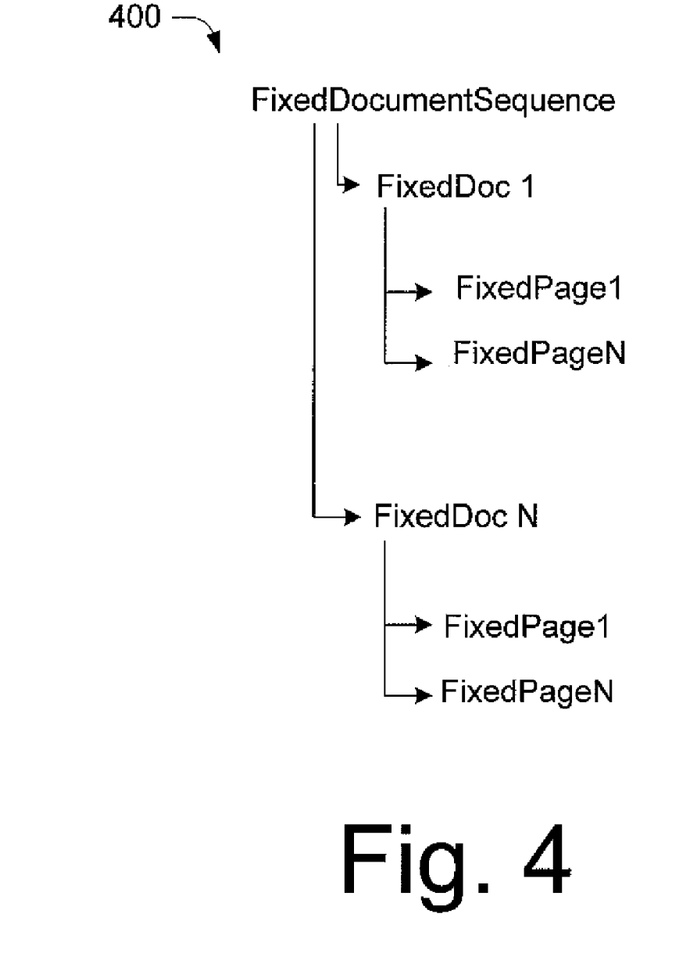
FIG. 4 illustrates an exemplary logical representation of an XPS document in accordance with one embodiment.

FIG. 4 illustrates an exemplary logical representation of an XPS document generally at 400.

The FixedDocumentSequence part assembles a set of fixed documents within the fixed payload. For example, a printing client can assemble two separate documents, a two-page cover memo and a twenty-page report (both are FixedDocument parts), into a single package to send to the printer.

The FixedDocumentSequence part is the only valid root of a fixed payload. Even if an XPS Document contains only a single fixed document, the FixedDocumentSequence part is still used. One FixedDocumentSequence part per fixed payload is required. Accordingly, manipulations of this valid root can be performed to corrupt the file.

Fixed document sequence markup specifies each fixed document in the fixed payload in sequence, using <DocumentReference> elements. The order of <DocumentReference> elements determines document order and must be preserved by editing consumers. Each <DocumentReference> element should reference a FixedDocument part by relative URI. Accordingly, at this level, manipulations can include corrupting the markup associated with the XPS file and/or the URI that references a FixedDocument part.

The FixedDocument part is a common, easily indexed root for all pages within the document. A fixed document identifies the set of fixed pages for the document.

The markup in the FixedDocument part specifies the pages of a document in sequence using <PageContent> elements. The order of <PageContent> elements determines page order and must be preserved by editing consumers. Each <PageContent> element should reference a FixedPage part by relative URI.

The FixedPage part contains all of the visual elements to be rendered on a page. Each page has a fixed size and orientation. The layout of the visual elements on a page is determined by the fixed page markup. This applies to both graphics and text, which is represented with precise typographic placement. The contents of a page are described using a powerful but simple set of visual primitives.

Each FixedPage part specifies the contents of a page within a <FixedPage> element using <Path> and <Glyphs> elements (using various brush elements) and the <Canvas> grouping element. The <ImageBrush> and <Glyphs> elements (or their child or descendant elements) can reference Image parts or Font parts by URI. They should reference these parts by relative URI.

XPS Document markup is an XML-based markup language that uses elements, attributes, and namespaces. The schema for XPS Document markup includes only elements and their attributes, comments, and whitespace. Arbitrary character data intermingled in the markup is not allowed. Manipulations of the markup can comprise manipulating or corrupting elements, attributes, namespaces and the like.

Fixed page markup is expressed using elements and attributes and is based on a higher-level abstract model of contents and properties. Some fixed page elements can hold "contents," which are expressed as child elements. Properties may be expressed either as attributes or child elements.

XPS Document markup also uses resources and resource dictionaries, which allow elements to share property values.

At the above-described logical representation level, any of the manipulations and corruptions described above can be utilized.

With regard to the content representation of an XPS document, consider the following.

XPS Documents contain a root fixed document sequence that binds a collection of fixed documents which, in turn, bind a collection of fixed pages. All page markings are specified with <Glyphs> or <Path> elements on the fixed page. These elements can be grouped within one or more <Canvas> elements. Page markings are positioned by real-number coordinates in the coordinate space of the fixed page. The coordinate space can be altered by applying a render transformation.

The <FixedDocumentSequence> element contains one or more <DocumentReference> elements. The order of <DocumentReference> elements must match the order of the documents in the fixed document sequence. Accordingly, manipulations at this point can include changing the order of the elements to create a mismatch.

The <DocumentReference> element specifies a FixedDocument part as a URI in the Source attribute. Producers must not produce a document with multiple <DocumentReference> elements that reference the same fixed document. Accordingly, one manipulation at this level might be to reference the same fixed document with multiple <DocumentReference> elements.

The <FixedDocument> element contains one or more <PageContent> elements. The order of <PageContent> elements must match the order of the pages in the document.

Each <PageContent> element refers to the source of the content for a single page. The number of pages in the document can be determined by counting the number of <PageContent> elements. The <PageContent> element has one allowable child element, <PageContent.LinkTargets>, and it must not contain more than a single child element. Producers must not produce markup where a <PageContent> element references the same fixed page referenced by any other <PageContent> element in the entire XPS Document, even in other fixed documents within the fixed payload.

The <PageContent.LinkTargets> element defines the list of link targets that specify each named element on the page that may be addressed by hyperlink.

The <LinkTarget> element specifies a Name attribute, which corresponds to a named location within the fixed page specified by its parent <PageContent> element. By encapsulating this information in the fixed document, consumers do not need to load every FixedPage part to determine if a particular Name value exists in the document.

The <FixedPage> element contains the contents of a page and is the root element of a FixedPage part. The fixed page contains the elements that together form the basis for all markings rendered on the page: <Paths>, <Glyphs>, and the optional <Canvas> grouping element.

The fixed page must specify a height, width, and default language. The coordinate space of the fixed page is composable, meaning that the marking effects of its child and descendant elements are affected by the coordinate space of the fixed page.

Additional markup elements of the XPS document and their descriptions can be found in the specification, referenced above. It is to be appreciated and understood that any of the manipulations and corruptions can be applied to the markup described above and in the XPS specification. Such manipulations and corruptions can be applied to change the overall semantics of the markup of the XPS document.

Exemplary Method

Figure 5:
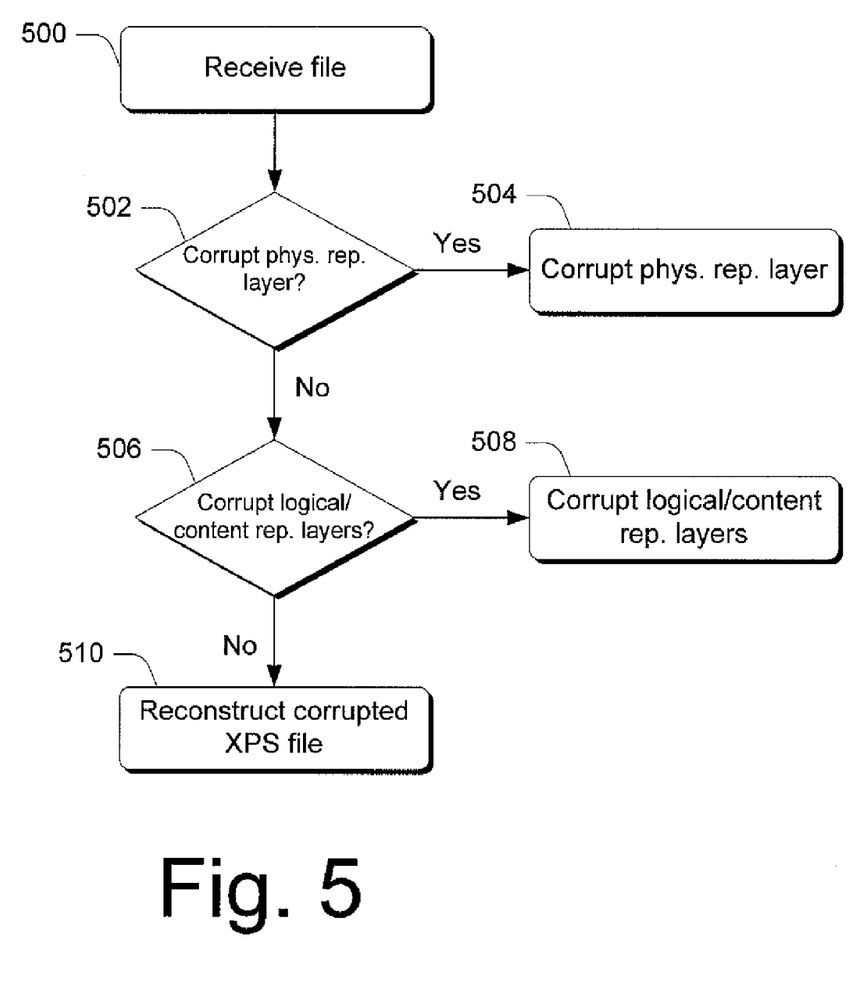
FIG. 5 is a flow diagram that describes steps in a method in accordance with one embodiment.

FIG. 5 is a flow diagram that describes steps in a method in accordance with one embodiment. The method can be implemented by any suitable hardware, software, firmware or combination thereof. But one example of a device that can implement the method of FIG. 5 is shown below in connection with FIG. 6.

Step 500 receives a file that is to be corrupted or "fuzzed". Any suitable file can be received. In the implementation example above, the file that is received is an XPS file. Step 502 ascertains whether to corrupt the physical representation layer. In the implementation example, the physical representation layer comprises the ZIP layer. If so, step 504 corrupts the ZIP layer. This step can be performed in any suitable way. In the implementation example, this step is performed by extracting the XPS file using a suitable ZIP algorithm, corrupting or otherwise fuzzing the ZIP layer or header, and reconstructing the XPS file with the corrupted ZIP layer or header. If the physical representation layer is not to be corrupted or at the conclusion of step 504, step 506 ascertains whether either or both of the logical representation layer or the content representation layer are to be corrupted. If so, step 508 corrupts either or both of the logical or content representation layers.

In the implementation example, this can be performed as follows. First, the XPS file is extracted using a ZIP algorithm (if previously unextracted). If the logical representation layer (also referred to as the OPC layer) is to be corrupted, then step 508 corrupts this layer using any of the techniques described above. If the logical representation layer is not to be corrupted—but the content representation layer is to be corrupted, then step 508 corrupts the content representation layer or the XML representation of the content. In addition, at this level, recall that individual resources can also be corrupted.

It is to be appreciated that either or both of the logical representation layer or the content representation layer can be corrupted or fuzzed.

If the outcome of step 506 is "No" or the logical and/or content representation layers have been corrupted, then step 510 reconstructs the XPS file to provide a corrupted XPS file.

Having produced a corrupted XPS file, individual consuming devices can now have their security and integrity tested by processing the individual corrupted files.

Exemplary System

Figure 6:
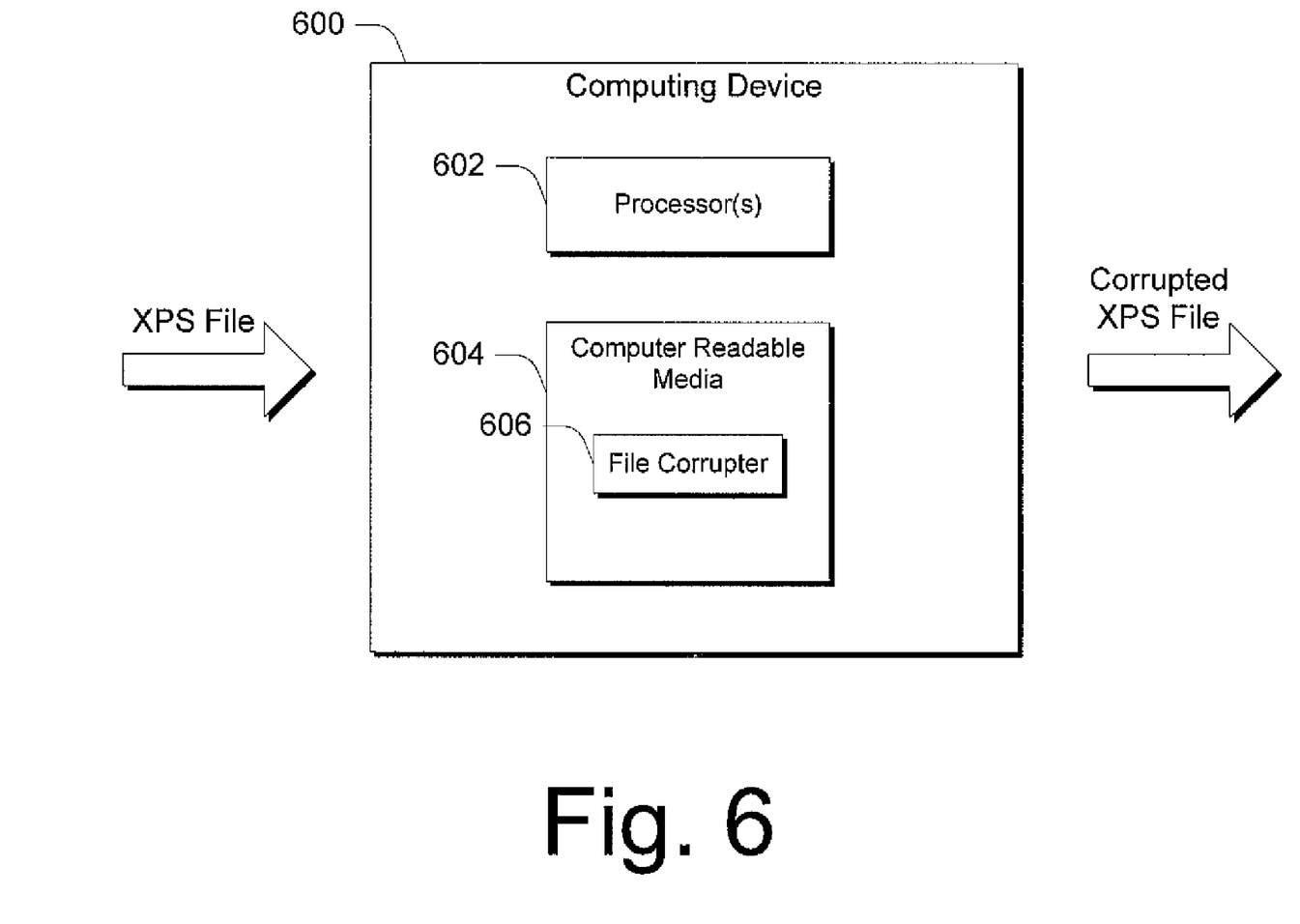
FIG. 6 illustrates an exemplary system in accordance with one embodiment.

FIG. 6 illustrates an exemplary system, generally at 600, in accordance with one embodiment. Here, system 600 comprises a computing device that includes one or more processors 602, one or more computer-readable media 604 (such as ROM, RAM, flash memory, hard disk and the like), and computer-readable instructions in the form of a file corrupter component 606.

Here, the file corrupter component 606 is executable by the one or more processors to implement the functionality described above.

CONCLUSION

The methods and systems described above provide an approach for corrupting file representations at multiple different levels to provide a robust file corruption tool. In accordance with the described embodiments, file representation corruption can take place at a file's physical representation, logical representation and/or content representation.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
receiving a file having a file representation; and
corrupting the file representation at multiple levels,
wherein the multiple levels comprise a physical representation level, a logical representation level and a content representation level.

2. The method of claim 1, wherein the physical representation level comprise a ZIP archive level.

3. The method of claim 1, wherein the act of corrupting comprises corrupting a header of the physical representation level.

4. The method of claim 2, wherein the act of corrupting comprises corrupting one or more fields of the header.

5. The method of claim 1, wherein the act of corrupting comprises clipping a portion of the physical representation level.

6. The method of claim 1, wherein the act of corrupting comprises corrupting interleaving of file portions at the logical representation level.

7. The method of claim 6, wherein the act of corrupting comprises changing an interleaving structure at the logical representation level.

8. The method of claim 1, wherein the act of corrupting comprises corrupting a directory structure at the logical representation level.

9. The method of claim 1, wherein the act of corrupting comprises corrupting an index file at the logical representation level.

10. The method of claim 1, wherein the act of corrupting comprises corrupting physical file content of a file at the content representation level.

11. The method of claim 1, wherein the act of corrupting comprises corrupting an index file of a file at the content representation level.

12. One or more computer-readable media having computer-readable instructions thereon which, when executed by one or more processors, cause the processors to implement a method comprising:
receiving a file having a file representation;
corrupting the file representation at a physical representation level by corrupting a header or clipping a portion of the physical representation level;
corrupting the file at a logical representation level by corrupting an interleaving or directory structure at the logical representation level; and
corrupting the file at a content representation level by corrupting physical file content of the file at the content representation level.

13. The one or more computer-readable media of claim 12, wherein the file comprises an XPS file.

14. One or more computer-readable media having computer-readable instructions thereon which, when executed by one or more processors, cause the one or more processors to implement a method comprising:
receiving an XPS file having a file representation;
corrupting the file representation at multiple levels, wherein the multiple levels comprise a physical representation level, a logical representation level and a content representation level, and wherein said act of corrupting comprises at least corrupting data at the logical or content representation level.

15. The one or more computer-readable media of claim 14, wherein said act of corrupting comprises corrupting data at the physical representation level.

16. The one or more computer-readable media of claim 15, wherein said act of corrupting comprises corrupting a header at the physical representation level.

17. The one or more computer-readable media of claim 15, wherein said act of corrupting comprises corrupting markup associated with the XPS file.

18. The one or more computer-readable media of claim 15, wherein said act of corrupting comprises corrupting a URI associated with the XPS file.

19. The one or more computer-readable media of claim 15, wherein said act of corrupting comprises corrupting physical file content of a file at the content representation level.

20. The one or more computer-readable media of claim 15, wherein said act of corrupting comprises corrupting a directory structure at the logical representation level.

* * * * *